Patented Apr. 14, 1936

2,037,669

UNITED STATES PATENT OFFICE 2,037,669

BITUMINOUS DISPERSIONS

Robert R. Thurston, Beacon, N. Y., assignor to The Texas Company, New York, N. Y., a corporation of Delaware No Drawing. Application October 14, 1932, Serial No. 637,788

5 Claims. (Cl. 134—1)

This invention relates to the production of dispersions or emulsions of thermoplastic hydrocarbon materials, such as petroleum asphalt, paraffin, etc.

In particular, the invention contemplates the production of saponifiable materials available as a by-product in the treatment of petroleum vapors at petroleum refineries and the use of these materials as ingredients in forming stabilizing agents for said dispersions.

It has been determined that where raw naphtha vapors, produced by cracking or distilling crude oils, are treated for the purpose of removing the gummy and resinous materials, such as the unsaturated hydrocarbons, aromatics, etc., the removed materials, herein referred to as polymers, possess fairly high saponification value and are otherwise satisfactory when reacted with alkali for forming stabilizing agents for dispersed particles of hydrocarbon materials supported in water as the external phase.

The preferred method of obtaining the polymers for the purpose stated herein is to remove the material adsorbed upon a catalytic adsorbent material, such, for example, as fuller's earth which has become spent in the treatment of raw petroleum naphtha. The polymers may be removed by steaming or otherwise but it is preferred to extract the adsorbed materials by the use of a suitable solvent, such as acetone or benzol or a combination of these or equivalent solvents, the solvent being thereafter separated from the polymers as by evaporation.

As an example of the production of a typical specimen of the polymers referred to herein, a solvent comprising a combination of equal parts of acetone and benzol was applied to Riverside fuller's earth, which had become spent in the treatment of cracked petroleum naphtha in vapor form. The dissolved material was a soft, semi-liquid material of bad odor having the following characteristics:

| | |
|---|---|
| Specific gravity at 77° F | 1.0+ |
| Iodine value | 140. |
| Neutralization number | 2.79 |
| Saponification value | 27.3 |
| Per cent unsaponifiable | 58.6 |

Ultimate analysis of this material showed:

| | |
|---|---|
| Carbon, per cent | 82.42 |
| Hydrogen, per cent | 9.45 |
| Sulfur, per cent | 1.07 |
| Ash, per cent | 0.05 |
| Oxygen by difference | 7.01 |

Anaylsis of different specimens of the adsorbed bodies removed from spent catalytic adsorbent materials show that these bodies in general possess saponification values of from 25 to 150 or higher and that they are generally satisfactory for the purpose stated herein.

In the preparation of dispersions of asphalt, for example, the polymers obtained as stated above are mixed in the proportion of from 1% to 12% with any good grade of petroleum asphalt, heated to a fluid condition, to form the melt. The asphalt may then be dispersed while still heated or it may be permitted to solidify and later be reheated for dispersion since cooling does not produce any permanent changes in the constitutents of the melt.

The dispersion is formed by introducing the heated molten melt into a body of slightly alkaline water while maintaining the temperature between 170° F. to 212° F., the materials being agitated and mixed for a period of from 30 seconds to 3 minutes to produce the desired degree of dispersion. The dispersion is preferably effected in a suitable dispersing machine into which the asphalt and water are continuously introduced and from which the dispersion is continuously discharged. The degree of alkalinity of the water may vary slightly although it should be sufficient to cause the resulting dispersion to react alkaline, finished dispersions having a pH value from 8 to 10 having been found satisfactory. The addition of from .1% to 1% of caustic soda or an equivalent alkali, based on the quantity of water, will produce an alkaline solution of the proper strength. The temperature maintained during dispersion of the asphalt particles, namely 170° F. to 212° F. is sufficient to permit the alkali in the aqueous solution to react with the saponifiable products in the melt for forming the protective colloids which serve to stabilize the dispersion. Higher melting point asphalts require the higher temperatures within the range stated. In order to have a sufficiently fluid dispersion for normal use, the water content should be not less than about 30% and it may be higher if greater fluidity is desired.

Dispersions of asphalt in water formed in accordance with the present invention are found to be sufficiently stable and otherwise satisfactory for normal uses. Thus when used for coating stone, for example, the emulsion remains in an emulsified condition until after the stone has been thoroughly coated and then the asphalt particles coalesce, breaking the emulsion within a short period of time. Samples of the dispersion have been subjected to temperatures of 140° F. and to 0° F. for long periods of time and when restored to normal temperatures were found to be in satisfactory condition for use.

While this specification contains specific statements of the best mode of applying the invention, as required, it is to be understood that various modifications of the invention are contemplated and that the invention is to be limited only as set forth in the appended claims.

I claim as my invention:

1. An emulsion of thermoplastic hydrocarbon material embodying a stabilizing agent comprising saponified products of materials adsorbed upon spent fuller's earth after use thereof in filtering cracked petroleum vapors and removed by a solvent of the type of acetone and benzol.

2. An asphalt emulsion embodying a stabilizing agent comprising saponified polymers obtained from catalytic adsorbent material employed in filtering cracked petroleum vapors.

3. The process of forming asphalt emulsions comprising adding gummy and resinous polymerized products, obtained from the treatment of cracked petroleum vapors for removal of color and gum forming constituents, to a body of molten asphalt as a base and dispersing said base in an alkaline aqueous medium.

4. The process of forming emulsions of thermoplastic hydrocarbon materials comprising treating filtering material, employed for filtering cracked petroleum naphtha, with a solvent for dissolving adsorbed materials therefrom, separating the solvent from the dissolved materials, mixing the dissolved materials with said thermoplastic hydrocarbon material and dispersing the same in an alkaline aqueous medium of from .1% to 1% strength.

5. An asphalt emulsion stabilized essentially by the reaction products of an alkali and the gummy and resinous products removed during the treatment of cracked petroleum naphtha for removal of color and gum forming constituents.

ROBERT R. THURSTON.